(12) United States Patent
Moskovits

(10) Patent No.: US 12,478,170 B2
(45) Date of Patent: Nov. 25, 2025

(54) EARBUD HOLDING APPARATUS

(71) Applicant: Baruch B. Moskovits, Flushing, NY (US)

(72) Inventor: Baruch B. Moskovits, Flushing, NY (US)

(73) Assignee: Podmont LLC, Flushing, NY (US)

( * ) Notice: Subject to any disclaimer, the term of this patent is extended or adjusted under 35 U.S.C. 154(b) by 126 days.

(21) Appl. No.: 18/314,097

(22) Filed: May 8, 2023

(65) Prior Publication Data

US 2024/0374018 A1 Nov. 14, 2024

(51) Int. Cl.
| | | |
|---|---|---|
| *H04M 1/02* | (2006.01) | |
| *A45F 5/00* | (2006.01) | |
| *B65D 25/02* | (2006.01) | |

(52) U.S. Cl.
CPC .............. *A45F 5/00* (2013.01); *B65D 25/02* (2013.01); *A45F 5/1508* (2025.01)

(58) Field of Classification Search
CPC .......... A45C 2011/001; A45C 11/001; H04M 1/0258; A45F 5/1508; A45F 5/1516; H04R 1/105
See application file for complete search history.

(56) References Cited

U.S. PATENT DOCUMENTS

| | | | |
|---|---|---|---|
| 7,648,027 B2 * | 1/2010 | Lin | H04M 1/04 206/320 |
| 9,204,711 B2 * | 12/2015 | Schaffer | A45F 5/00 |
| 9,445,178 B2 * | 9/2016 | Rothbaum | H04M 1/15 |
| 10,028,559 B2 | 7/2018 | Gronewoller et al. | |
| D915,387 S * | 4/2021 | Markey | D14/251 |
| 2002/0054678 A1 * | 5/2002 | Sawyer | B60R 11/0247 379/454 |
| 2012/0077556 A1 * | 3/2012 | McKendrick | H04M 1/04 455/575.8 |
| 2013/0148839 A1 * | 6/2013 | Stevinson | H04R 1/1033 381/384 |
| 2014/0161301 A1 * | 6/2014 | Merenda | H04R 1/1041 381/384 |

* cited by examiner

*Primary Examiner* — Adam J Waggenspack
(74) *Attorney, Agent, or Firm* — Macheledt Bales LLP; Jennifer L. Bales

(57) ABSTRACT

An earbud holder has a body for sticking to a cell phone or the like and a quiver assembly forming quiver bores for holding earbud extensions. The body may fold along a living hinge so that the top of the body can be affixed to the top edge of the phone and the bottom of the body can stick to the back of the phone. The living hinge might be a score formed along the front or back of the body or might just be a bendable area on the body. An earbud holder with a quiver assembly forming quiver bores for holding earbud extensions integrated as one object with a phone case. The quiver bores are sized to hold earbuds by inserting the earbud extensions into the quiver bores.

19 Claims, 15 Drawing Sheets

EARBUD HOLDING APPARATUS

BACKGROUND OF THE INVENTION

This application incorporates U.S. patent application Ser. No. 29/886,052, filed 3 Mar. 2023, and entitled "Earbud Holder", herein by reference.

FIELD OF THE INVENTION

The present invention relates to an accessory for holding earbuds or the like.

DISCUSSION OF RELATED ART

Smart phones have given rise to a plethora of ancillary accessories that amplify the user's use of their smart phone directly or indirectly by providing containment or functionality for other accessory devices used with smartphones such as earphones, AirPods®, earbuds, and the like. AirPods® for example are used by a significant percent of owners and users of Apple iPhones® in particular and other smartphones as well.

SUMMARY OF THE INVENTION

Apparatus for holding earbuds includes a body for adhering to an electronic device such as a mobile phone. The apparatus has a body which adheres to a surface of the phone, typically the back. Attached to the front of the body (or formed integrally with the body) is a quiver assembly forming bores called quiver bores. The quiver bores are configured to hold an elongated extension from earbuds or the like. An upper portion of the body is configured to bend backward to form a perpendicular angle with the lower portion of the body. The inner surface of the foldable top then adheres to an edge of the device, e.g. the top of the device, while the inner surface of the lower portion of the body adheres to a vertical surface of the device, e.g. the back of the device. A living hinge may be formed in the body between the foldable top of the body and the bottom portion of the body, to facilitate bending. The living hinge may comprise a score formed between the foldable top of the body and the lower portion of the body, either on the front or the back of the body. The groove within the score may be, for example, circular, rectangular or square in shape and may be used to guide a precise alignment of the junction where the lower and upper portion of the body meet onto the edge where the vertical back and horizontal top of an electronic device, such as a phone, meet. In other embodiments the living hinge may be a foldable top, but neither the front nor the back of the body has a scored groove. A further embodiment may consist of an integrated quiver assembly forming bores that is crafted as part of and completely integrated as one object into a smartphone case.

Apparatus for holding an element such as an earbud includes a body having a top foldable portion connected to a lower portion along a living hinge and a quiver assembly forming a quiver bore. The top foldable portion has a top foldable inner face and a top foldable outer face. The lower portion has a lower portion inner face and a lower portion outer face.

The quiver assembly is attached to the lower portion outer face and is configured to allow a portion of the element to be inserted into and removed from the quiver bore, e.g. an earbud extension is inserted into the quiver bore and the top of the earbud sticks out past the quiver bore. Adhesive attaches the top foldable inner face to a horizontal surface of an object and to attach the lower portion inner face to a vertical surface of the object.

The object is generally an electronic device such as a cell phone. Often the quiver assembly has two quiver bores to hold two earbud extensions. The bores might be tapered, and can be open at both ends.

The living hinge might be a score formed between the top foldable inner face and the lower portion inner face, or a score formed between the top foldable outer face and the lower portion outer face, or could just be a flexible area to allow folding. Generally the body, the living hinge, and the quiver are all integrally formed.

As a feature, the bottom of the quiver assembly is slanted upward and away from the body to reduce the chances of the quiver assembly catching on things. Similarly, the body may have rounded corners to adhere better and not catch on things.

The adhesive might be a single piece sized to cover the top foldable inner face and the lower portion inner face, or it could be smaller, or comprise more than one piece.

Apparatus for holding earbuds' earbud extensions has a case configured to encase a portion of an electronic device and a quiver assembly integrated with the case and forming two quiver bores. The quiver bores are configured to hold the ear bud extensions. The quiver assembly is oriented at an edge of the case, so that when the earbud extensions are inserted into the quiver bores, the tops of the earbuds extend over the edge of the case.

The case may encase the entire electronic device or a portion of it. The bottom of the quiver assembly is slanted upward and away from the body. The bores may be tapered and may be open at both ends.

As an alternative, a quiver assembly forms at least one quiver bore configured such that a portion of the element may be inserted into and removed from the quiver bore and adhesive configured to attach the quiver assembly to an object such as an electronic device or a flat surface like a wall. The device may have an extension past the quiver assembly which also adheres to the object, and the extension may fold over an edge of the object and stick to the edge of the object.

DETAILED DESCRIPTION OF THE INVENTION

TABLE 1

| Ref. No. | Element |
| --- | --- |
| 100, 200 | Earbud holding apparatus/earbud holder |
| 102 | Body |
| 104 | Quiver assembly |
| 106 | Quiver bores |
| 108 | Living hinge |
| 110 | Foldable top of body |
| 111 | Lower portion of body |
| 112 | Outer face of lower portion of body |
| 113 | Outer face of foldable top of body |
| 114 | Inner face of lower portion of body |
| 115 | Inner face of foldable top of body |
| 116 | Top of quiver assembly |
| 118 | Bottom of quiver assembly |
| 120 | Angle between body and bottom of quiver assembly |
| 122 | Corner of body |
| 124 | Attachment area between body and quiver assembly |
| 126 | Earbuds |
| 128 | Earbud extensions |
| 130 | Space between body and quiver bores |
| 132 | Space between quiver bores |
| 300 | Electronic device |
| 302 | Adhesive |
| 304, 306 | Peel-off layer |
| 308 | Adhesive lift tab |
| 500 | Separated earbud holders |
| 600 | Earbud holder without a scored living hinge |
| 700 | Earbud holder integrated with case |
| 702 | Earbud holder portion |

Table 1 shows example elements of earbud holders described below along with associated reference numbers for convenience.

Figure 1A:
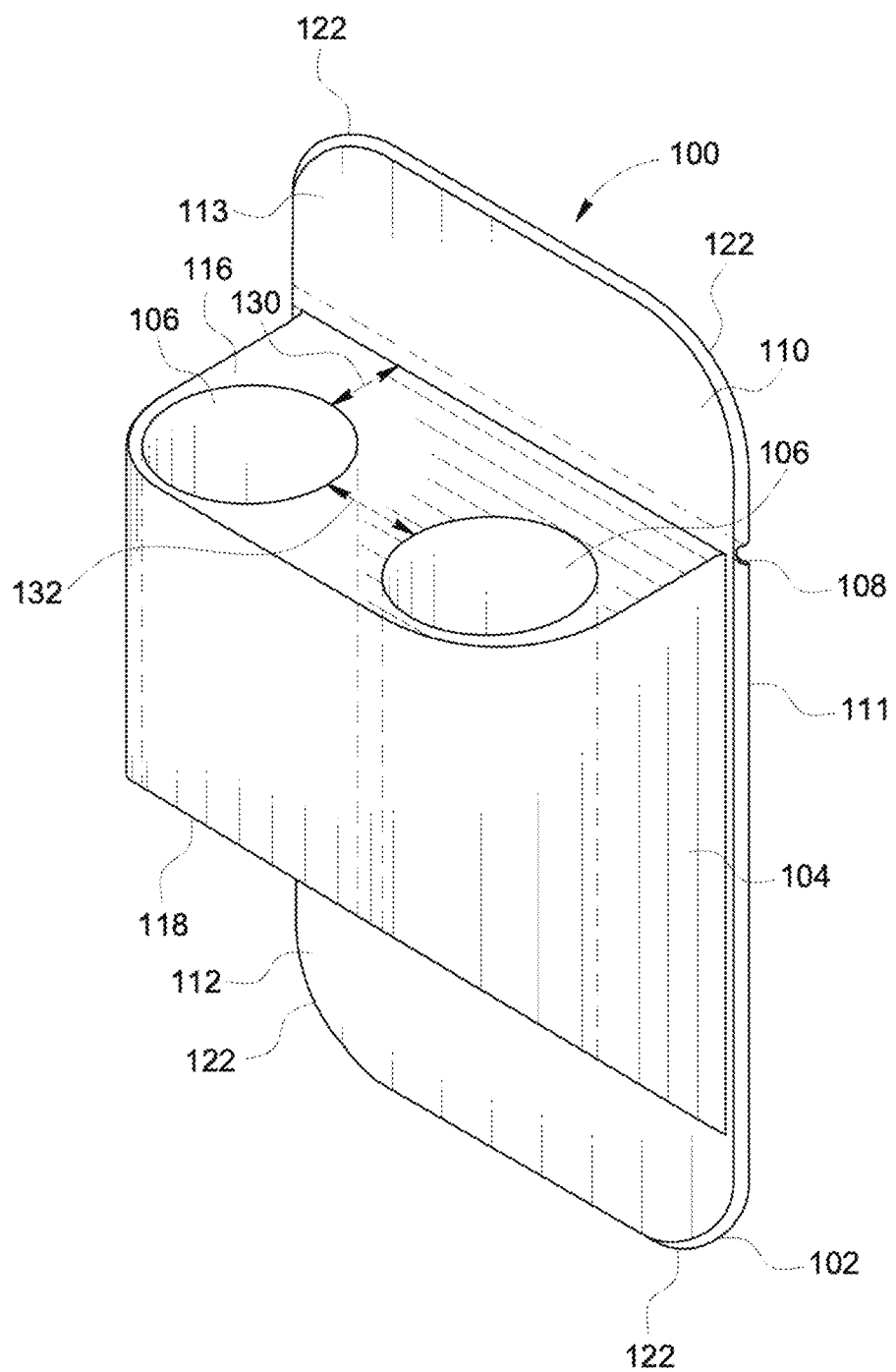
FIG. 1A is a front isometric drawing of an example of an earbud holder with a living hinge on the back.
Figure 1B:
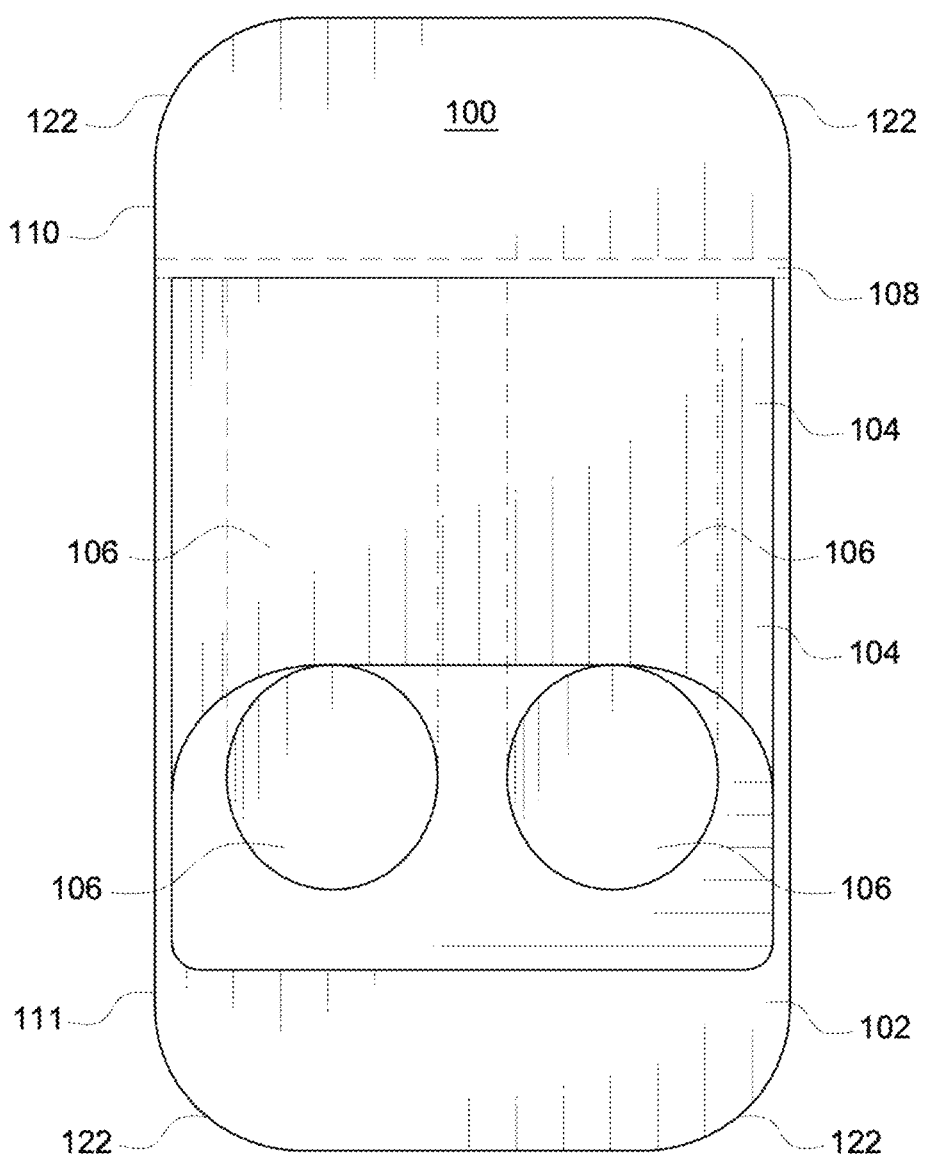
FIG. 1B is a front view of the earbud holder of FIG. 1A.
Figure 1C:
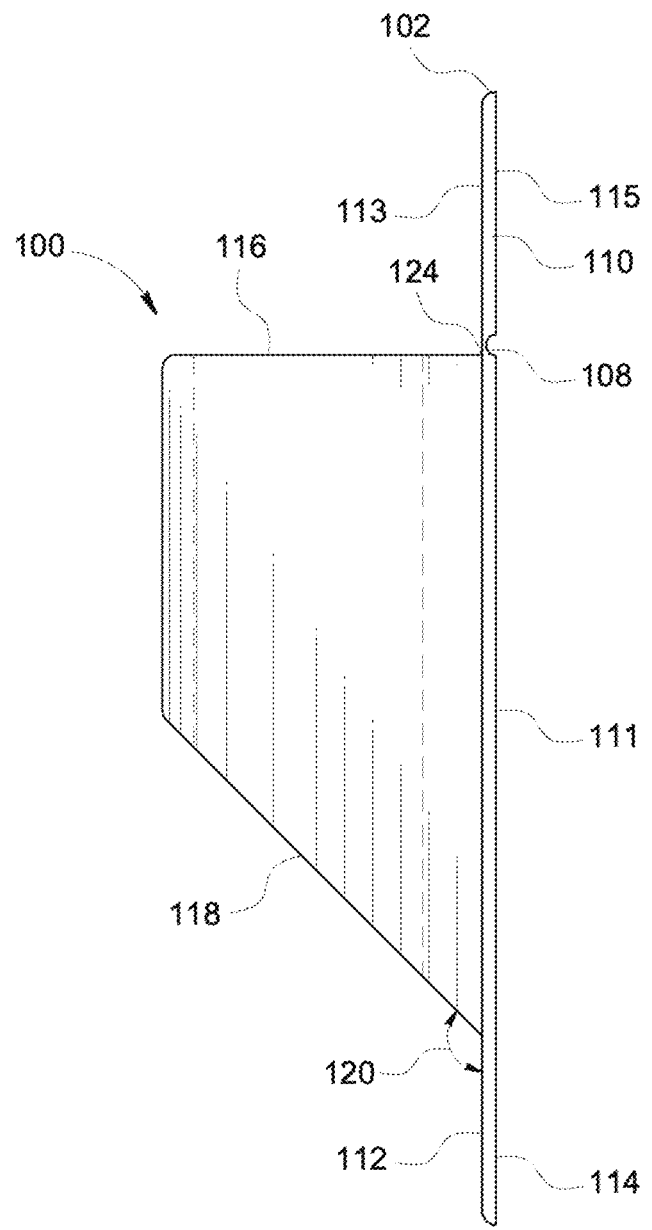
FIG. 1C is a side view of the earbud holder of FIG. 1A.
Figure 1D:
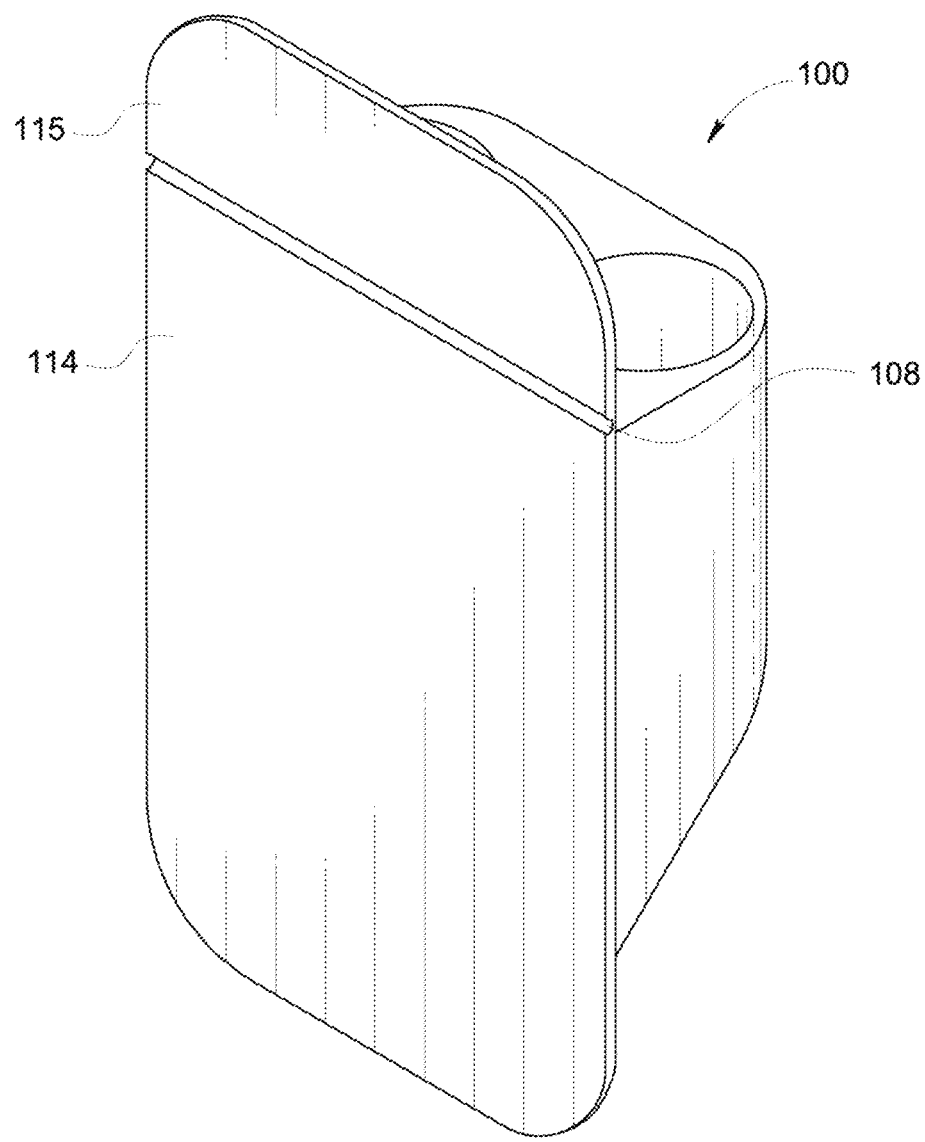
FIG. 1D is a back isometric view of the earbud holder of FIG. 1A.
Figure 1E:
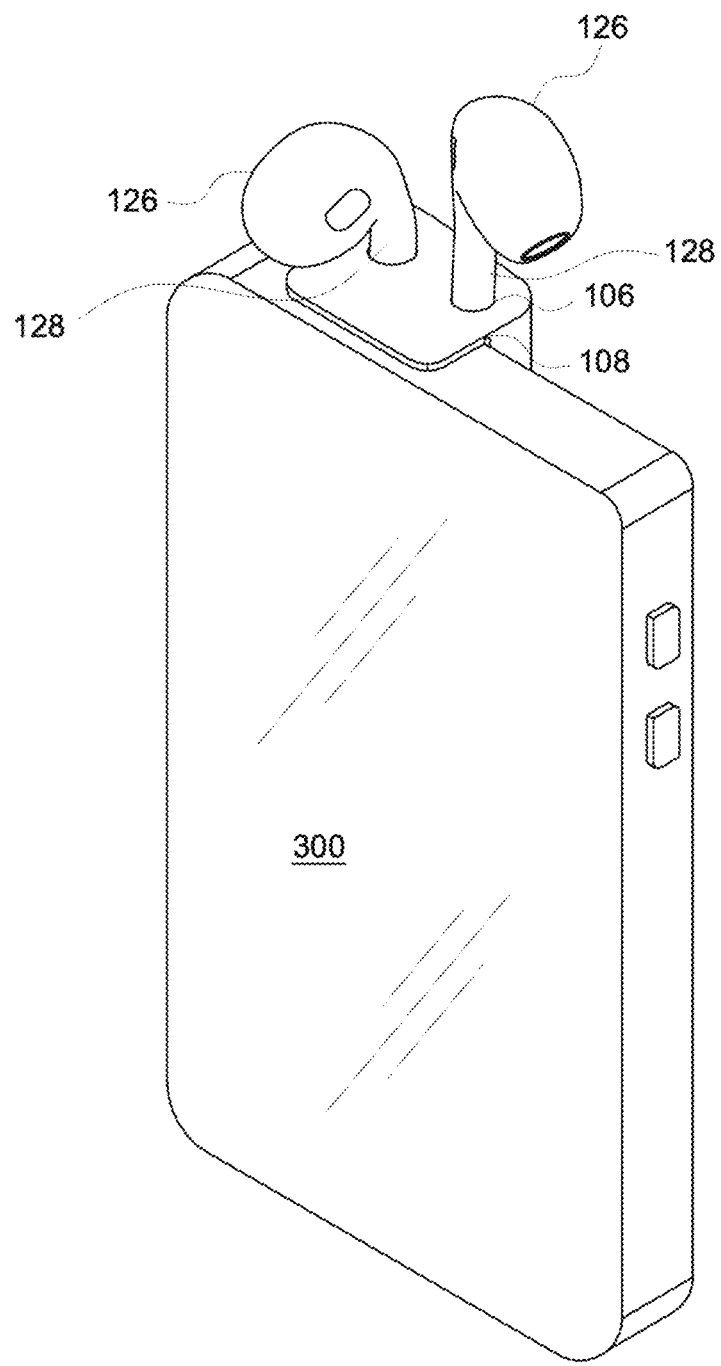
FIG. 1E is a back isometric view of the earbud holder of FIG. 1A used with earbuds affixed to an electronic device.

FIGS. 1A-1E show a first example of an earbud holder 100. FIG. 1A is a front isometric drawing of earbud holder 100, while FIG. 1B is a front view, FIG. 1C is a side view, and FIG. 1D is a back isometric view. FIG. 1E shows an earbud holder 100, with earbuds inserted, affixed to an electronic device 300, for example a cell phone.

Earbud holder 100 has a body 102, with a quiver assembly 104 affixed to the front of body 102. Body 102 and quiver assembly 104 may be separate elements attached together, or they may be integrally formed. In the example of FIG. 1A, living hinge 108 is formed between lower portion 111 of the body and foldable top portion 110 of the body. In FIG. 1A, living hinge 108 is a score formed on the back surface of body 102, along the edge between lower portion 111 and foldable top portion 110. This allows foldable top portion 110 to be bent backwards to wrap around an edge of an electronic device 300 (see FIG. 1E). Then the inner face 114 of lower portion 111 is affixed to a horizontal portion of the electronic device 300 (such as the back) while the inner face 115 of foldable top portion 110 is affixed to an edge of the device (for example the top).

In an example of earbud holder 100, the holder is 32.4 mm tall by 8.6 mm thick by 18.1 mm wide. This is a convenient size and configuration for attachment to a mobile phone as shown in FIG. 1E. Of course these dimensions may vary. For a standard sized phone, holder 100 might be, for example, 20-50 mm tall, and 15-50 mm wide. These dimensions might be bigger for a bigger device such as a tablet, or to connect to a surface other than a device, or smaller if placed on other surfaces such as a wall, desk or other smaller devices.

The thickness of earbud holder 100 as a whole is usually more tightly constrained, as the earbuds limit how thin quiver assembly 104 can be, and quiver assembly 104 usually won't be made much thicker than necessary in order to prevent it from catching on things and to limit the thickness of earbud holder 100 affixed to device 300. But this may not be a concern if holder 100 is affixed to a surface other than a device, such as a wall. The thickness of body 102 affects how far from the phone earbuds 126 will protrude with less extension usually preferred. It is also often desirable to use less material to save costs as well as space.

In the example of FIG. 1A, the bottom of quiver assembly 104 is slanted up and away from body 102 (see also FIG. 1C). This helps prevent earbud holder 100 from catching on things, for example when a phone with an earbud holder 100 is placed in a pocket.

As an example, Apple Airpod® earbud extensions 128 are, for example, 6 mm in diameter so quiver bores 106 could have a radius of about 6 mm or a little more. If the diameter of the earbud extensions 128 are less the diameter of the quiver may also be less. Quiver bores 106 might taper in diameter to accommodate various sizes of earbud extensions 128. The thickness of holder 100 might then vary from 4 mm to 12 mm or more. Other accessories, such as other brands of earbuds are different dimensions, so the thickness of holder 100 may account for that. The quiver bores may taper toward the bottom. The inner surfaces of the quiver bores may be textured to reduce slipping and promote suction or stiction of any items placed in the quivers.

Living hinge 108 may be formed of a score in body 102 along a line connecting foldable top portion 110 and lower portion 111 of body 102. This score may be on the inner surface or the outer surface of body 102. Score 108 might have a radius of ¼ to ¾ the thickness of body 102, or between those dimensions. Score 108 might have a semi-circular cross section as shown here or form a triangular cross section notch, or some other shape (e.g. square or rectangular).

Holder 100 may be formed of a thermoplastic (e.g. TPE or TPV) and have a durometer of approximately 10-150 (for example 60-80). It is useful to have the material flex, but be stiff enough to provide structure.

FIG. 1B is a front view of earbud holder 100. In this example, corners 122 of body 102 are rounded. This can facilitate adhesion and prevent corners 122 from catching on things. Curved corners 122 are less likely to curl up or debond. The dotted lines in FIG. 1B show how quiver bores 106 extend downward within quiver assembly 104. In this example, quiver bores 106 are open at both ends, the bottom as well as the top.

FIG. 1C is a side view of the earbud holder of FIG. 1A. In this example, the angle between body 102 and the bottom 118 of quiver assembly 104 is about 120°. Living hinge 108 allows foldable top 110 to be bent backward, to wrap over the end of a phone for example. Inner surface 115 of foldable top 110 would then adhere to the top of the phone. Earbud holder 100 doesn't have to be bent—the entire back surface of body 102, comprising inner faces 114 and 115 can also stick to a flat or curved surface.

Figure 3A:
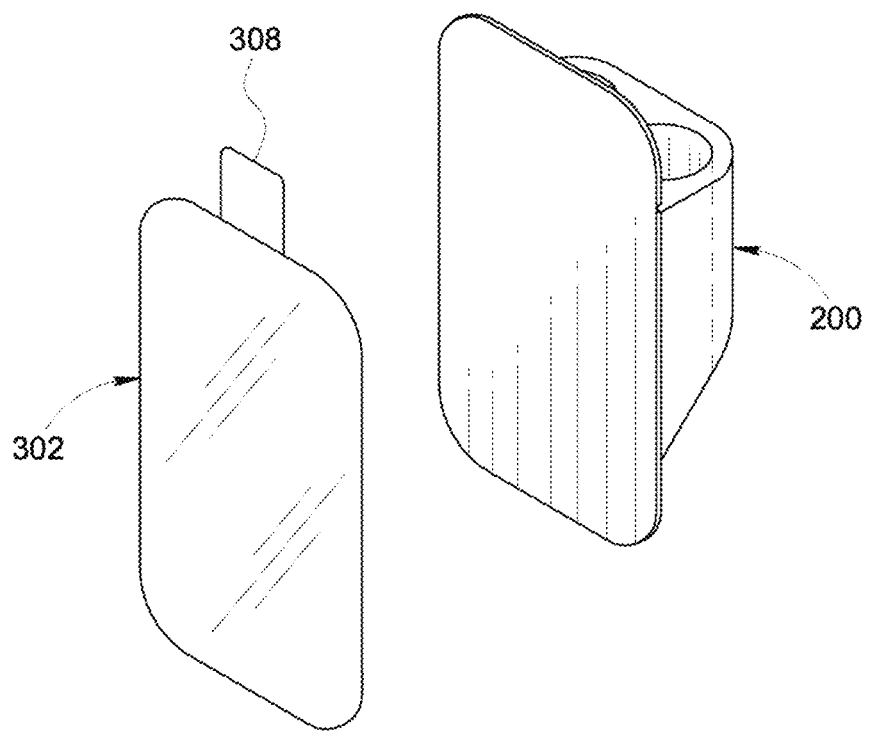
FIG. 3A is a back isometric view of adhesive used with an earbud holder.

FIG. 1D is a back isometric view of the earbud holder of FIG. 1A. Inner surfaces 114, 115 may have an adhesive 302 applied to them, as shown in FIG. 3A. FIG. 1E is a back isometric view of earbud holder 100 with earbuds 126. Earbud extensions 128 are configured to be removably inserted into quiver bores 106. In FIG. 1E, the left earbud extension 128 is inserted into its quiver while the right earbud extension 128 is being removed from its quiver. In other words, earbud extensions may be inserted into and removed from quivers as required.

Note that while this embodiment is shown with quiver assembly 104 and body 102, quiver assembly 104 could be used alone without body 102 by directly attaching quiver assembly 104 to an object. Or, quiver assembly 104 could be used with only a portion of body 104 that doesn't extend past the sides, bottom or top of quiver assembly 104 or any combination (body 104 doesn't extend past the top and bottom of quiver assembly 104, etc.).

Figure 2A:
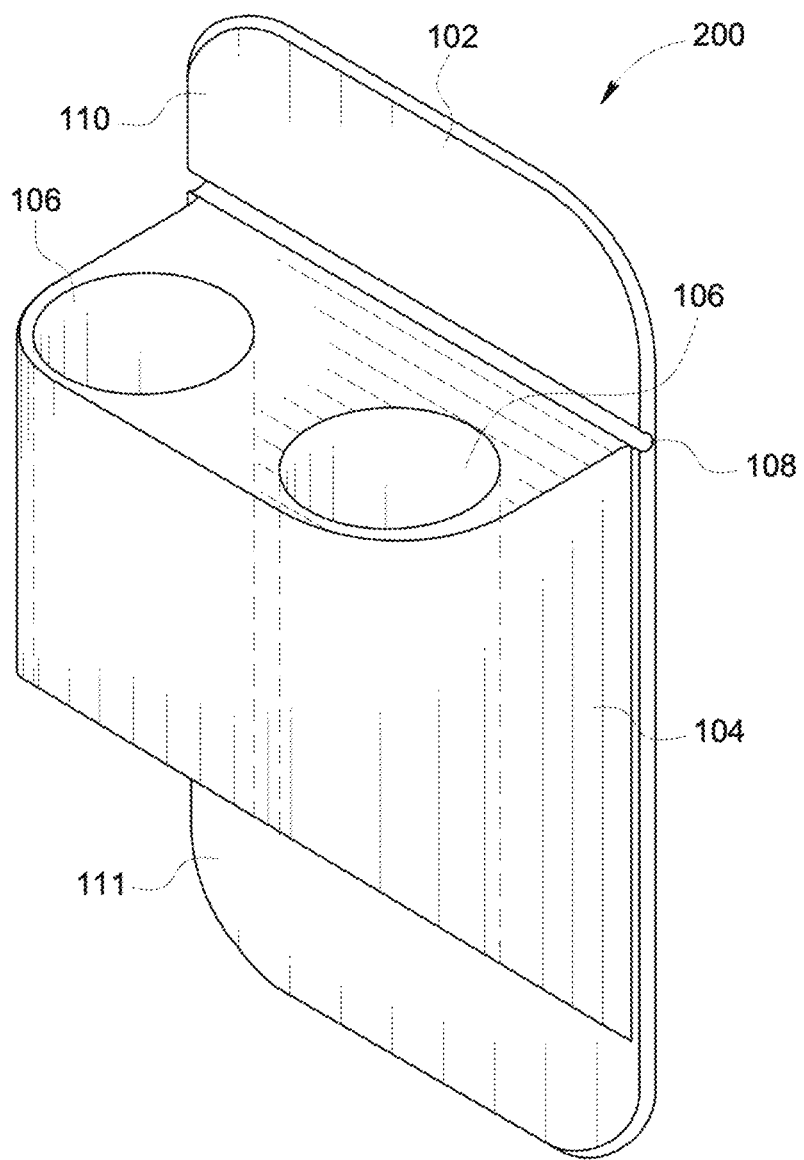
FIG. 2A is a front isometric drawing of another example of an earbud holder with a living hinge on the front.

FIG. 2A is a front isometric view of an earbud holder 200 with a living hinge 108 on the front of body 102, between foldable top 110 and lower portion 111. In other respects earbud holder 200 may be very similar to earbud 100. Like earbud holder 100, earbud 200 is configured so the foldable top 110 folds backward and its inner surface 115 adheres to the top of a device such as a phone. The inner surface 114 of lower portion 111 adheres to the back of the phone. Of course many other configurations are possible for earbud holder 100, 200, such as a bottom portion of body 102 folding back to adhere to a bottom of a phone, in some cases with a living hinge 108. Extensions from the sides of earbud holders 100, 200 could also wrap around a side (or top or bottom) of a device and living hinges could be provided along the sides.

Figure 2B:
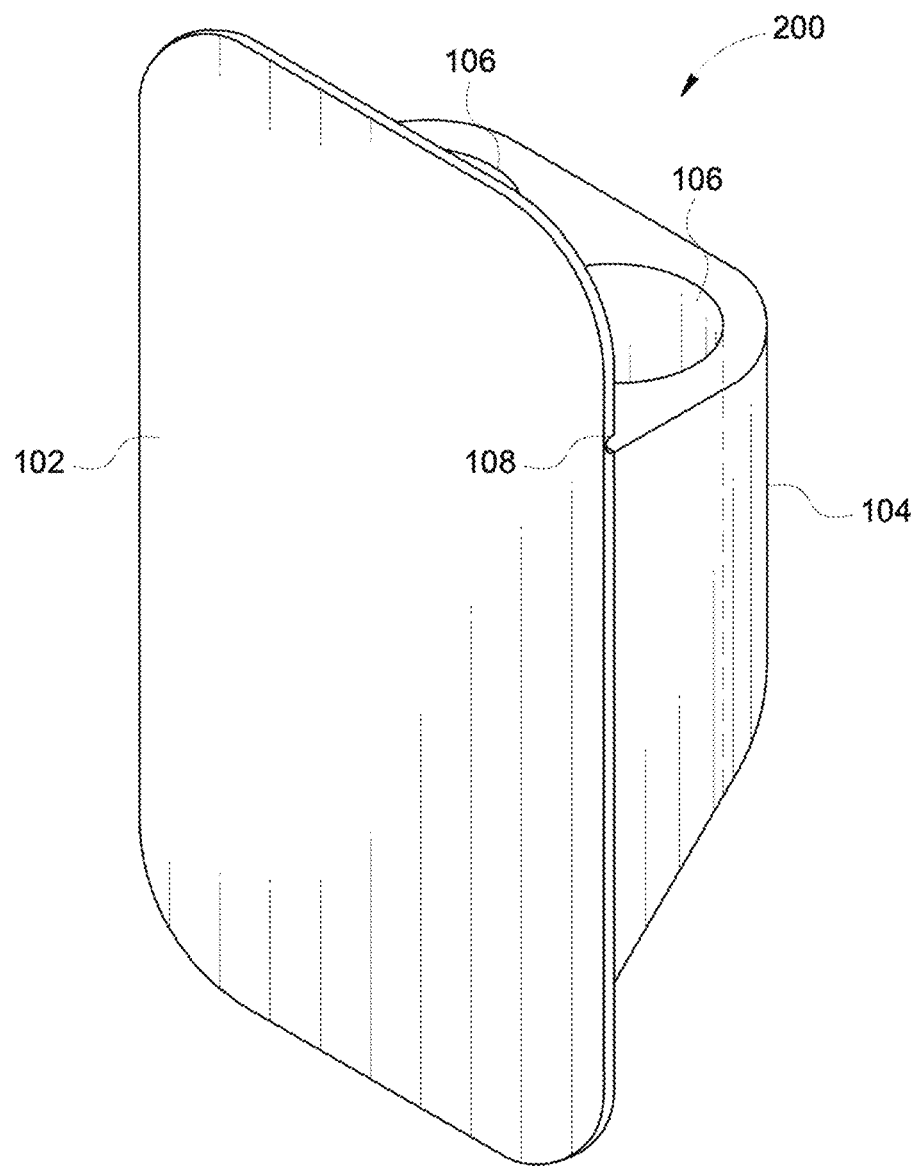
FIG. 2B is a back isometric drawing of the earbud holder of FIG. 2A.

FIG. 2B is a back isometric drawing of earbud holder 200.

FIG. 3A is a back isometric view of adhesive 302 used with an earbud holder 100, 200. The adhesive 302 used may be for example a double-sided adhesive or transfer adhesive or a liquid applied adhesive. The adhesive may be affixed to the inner surface of body 102 when earbud holder 100, 200 is sold, or may be applied later by a purchaser. The adhesive may be tailored to the surface material or dimensions of an electronic device 300 to which earbud holder 100, 200 will be affixed. For example, phones may have glass or aluminum surfaces, or other ceramics or metals. The adhesive may also be tailored to the profile of electronic device 300. For example, if the top of electronic device 300 is curved, a stronger high-bonding adhesive might be used. Earbud holder 100, 200 may also be affixed to a cell phone cover, which may be made of a variety of materials and benefit from the use of alternative bonding solutions.

Figure 3B:
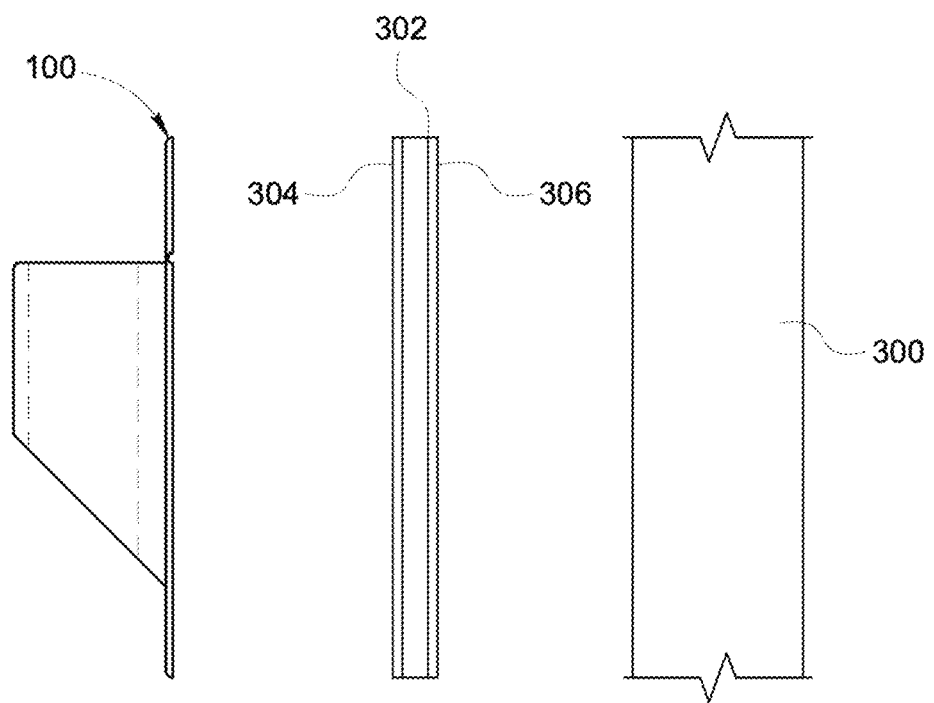
FIG. 3B is a side view of the adhesive of FIG. 3A with peel-off layers for sticking to an earbud holder and an electronic device.

FIG. 3B is a side view of adhesive 302 with peel-off layers 304, 306. In this example, adhesive 302 is originally separate from earbud holder 100, 200. Peel-off layer 304 is removed to stick adhesive 302 to earbud holder 100, 200, and peel-off layer 306 is removed to stick adhesive 302 to electronic device 300. If earbud holder 100, 200 comes with adhesive 302 already affixed, a peel-off layer 306 may be removed to stick the combination to electronic device 300.

In the example shown in FIG. 3B, a single piece of double-sided adhesive 302 is adhered to the entire back of body 102, shaped and sized to leave as little underlap between adhesive 302 and body 102, particularly at corners 122. A liner on the other side of adhesive 302 is left in place until a user wishes to adhere earbud holder 100, 200 to something else. The liner may have a pull tab for removal. Adhesive 302 may form two or more separate pieces, for example leaving a gap at living hinge 108. Adhesive 302 might in its entirety be between around 30-50 mm in length, 15-50 mm wide and 1-25 mil thick. The adhesive will often have bond strengthening properties over time and may withstand a high range of temperatures Fahrenheit from very cold (~−40°) to very hot (~300°). Often, the adhesive is bonded with pressure to a surface and is not removed for the duration of use, but in some cases it can be lifted off and replaced on the same or another surface and retain some adhesion and bonding power. While it preferably bonds strongly to a variety of plastic, metal, glass and paint surfaces it may also be configured to be removed without leaving behind difficult to remove residue. An adhesive could also be removed from body 102 and replaced with a replacement adhesive.

Figure 4A:
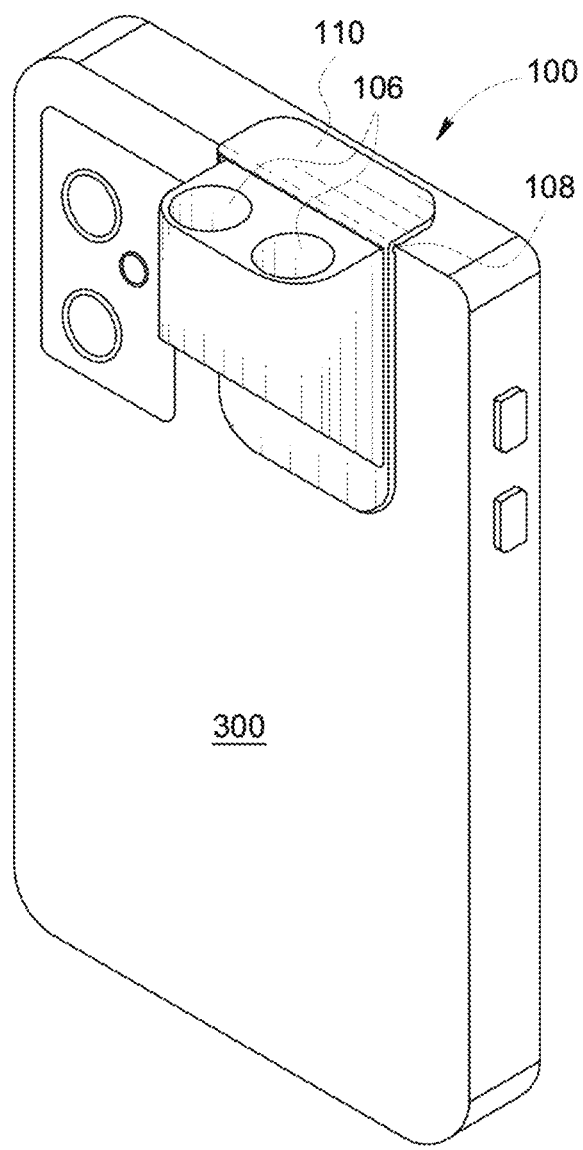
FIG. 4A is a front isometric view of the earbud holder of FIG. 1A, affixed to an electronic device.
Figure 4B:
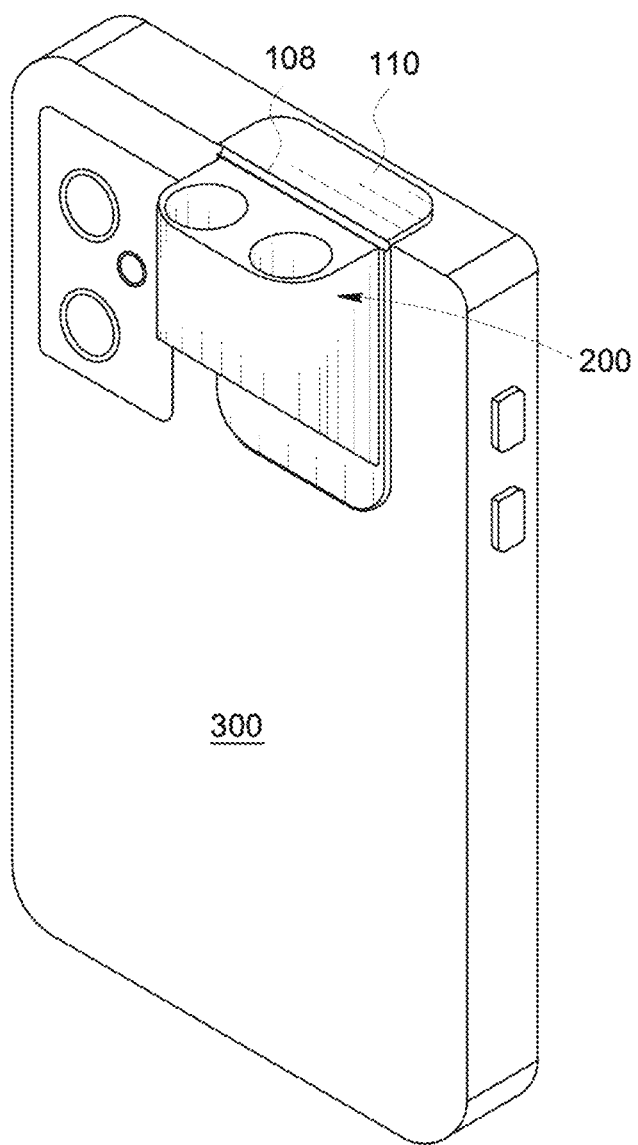
FIG. 4B is a front isometric view of the earbud holder of FIG. 2A, affixed to an electronic device.

FIG. 4A is a front isometric view of earbud holder 100 shown in FIGS. 1A-1E, affixed to an electronic device 300. Earbud holder 100 has a living hinge 108 on the back of body 102, allowing foldable top 110 to easily fold over the top of electronic device 300. FIG. 4B is a front isometric view of earbud holder 200 affixed to electronic device 300. Earbud holder 200 has a living hinge 108 formed on the front of body 102, also allowing foldable top 110 to easily fold over the top of electronic device 300.

Figure 5:
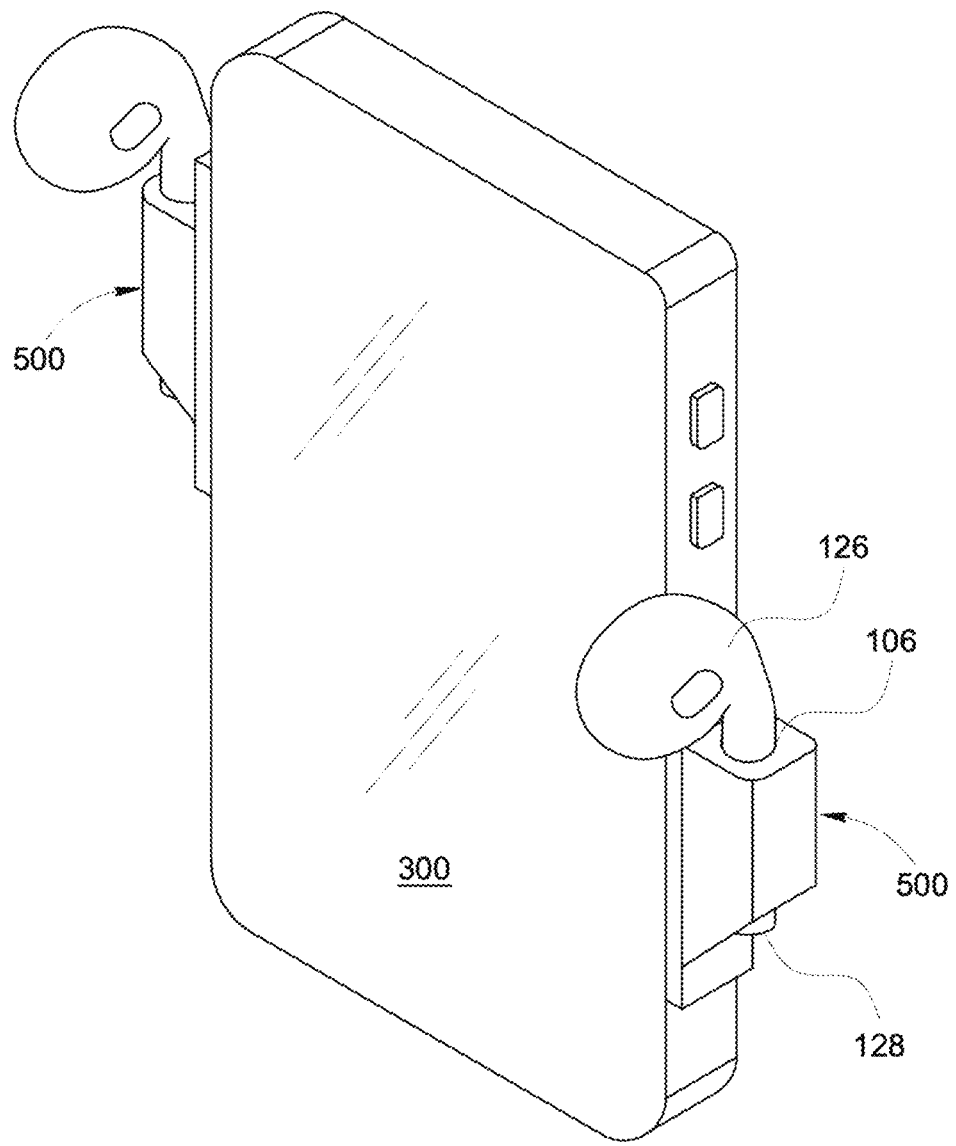
FIG. 5 is a front isometric drawing of a third example of an earbud holder.

FIG. 5 is a front isometric drawing of earbud holder 500. In this case, the two halves of earbud holder 500 have been separated along a vertical line, allowing the two halves to be adhered separately. For example, each half may be adhered to a different side of electronic device 300.

Figure 6:
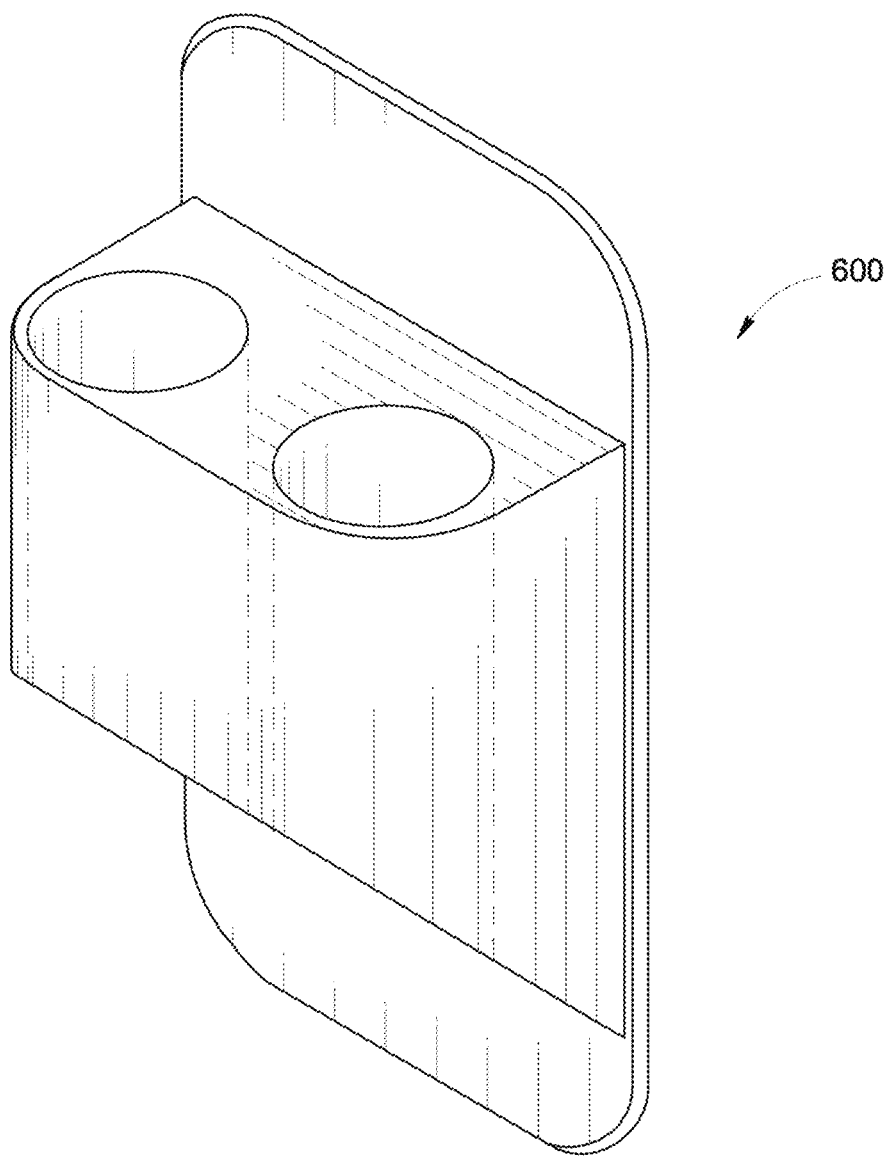
FIG. 6 is a front isometric drawing of a fourth example of an earbud holder.

FIG. 6 is a front isometric drawing of earbud holder 600. Earbud holder 600, with no scored living hinge 108, may be affixed to a flat surface without folding over, or with a sufficiently strong adhesive may be folded even without a score on either the front or the back of body 102. Then a foldable area of body 102 forms the living hinge. Body 102 may be smaller than shown, in any of the embodiments, by removing the top or bottom of body 102, or it may be larger, extending further in some or all directions.

Figure 7:
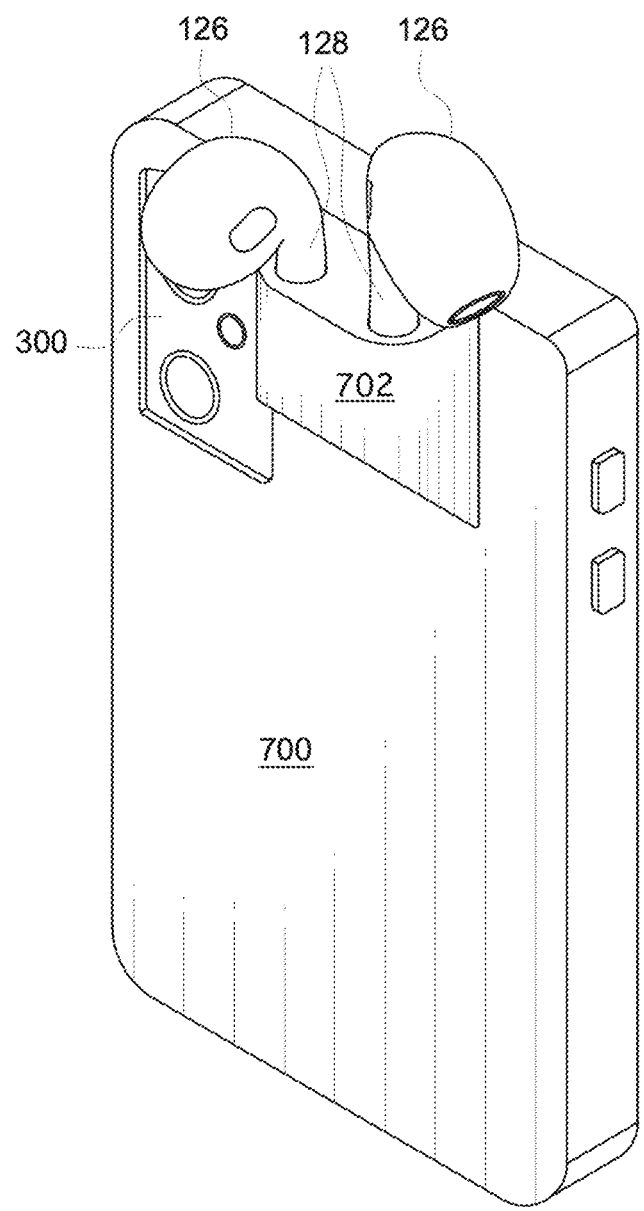
FIG. 7 is a front isometric view of an earbud holder integrally formed with a phone case.

FIG. 7 is a front isometric view of a phone case 700 including an integral earbud holder portion 702. In this example, a user does not have to adhere the earbud holder portion 702 to an electronic device, but can simply put the integrated case 700 on the device as usual. Earbud holder portion 702 does not need a foldable top or a living hinge, as the case itself extends over the top of the device. No adhesive is required. Case 700 may encase the entire electronic device 300 or a portion of electronic device 300, such as the top half.

Figure 8:
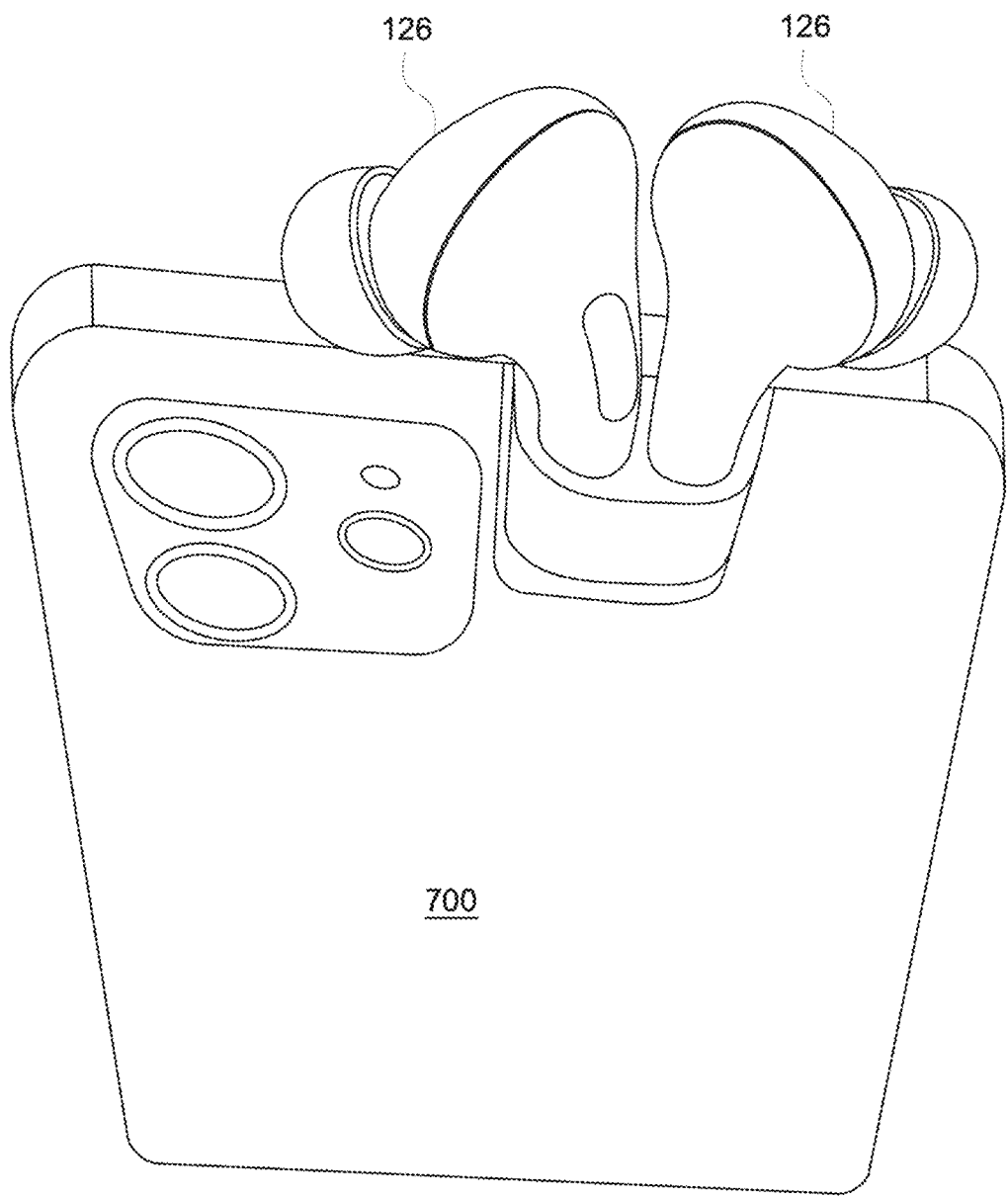
FIG. 8 is a front isometric view of an earbud holder used with earbuds configured in a uniform position along the top of an electronic device.

FIG. 8 is a front isometric view of earbud holder 100, 200, 600, 700 with earbuds 126 configured to lay along the horizontal top of electronic device 300 in a symmetrical alignment. The earbud holder 100, 200, 600 when placed on and folded over the horizontal top of electronic device 300, or with respect to earbud holder 700 when placed on electronic device 300, enables earbuds 126 to sit symmetrically above quiver bores 106 when earbud extensions 128 are inserted into quiver bores 106 by a user as follows. When facing the front of the earbud holder, the user removes a left ear earbud from their left ear, and then turns it 180 degrees to the left and inserts the left earbud into the left quiver bore. The user then removes the right ear earbud from their right ear, turns it 180 degrees to the right and places the right earbud into the right quiver bore. In this manner almost the entire thickness of the earbuds is maintained within the footprint of the thickness of electronic device. This alignment enables earbud holder 100, 200, 600, 700 together with electronic device 300 and earbuds 126 to be handled generally and removably inserted by the user into the user's pocket without getting caught on surrounding objects. Users of electronic devices generally prefer accessories that when added to their device increase the thickness of their devices minimally.

Terms such as "top", "lower", "inner face", "outer face", "horizontal", "vertical", etc. are used for convenience in describing the drawings. Those skilled in the art will appreciate that various configurations and placements of the device and the elements fall within the spirit of the device. For example, the top does not have to be facing upward in use.

While the exemplary preferred embodiments of the present invention are described herein with particularity, those skilled in the art will appreciate various changes, additions, and applications other than those specifically mentioned, which are within the spirit of this invention.

What is claimed is:

1. Apparatus for holding an element comprising:
    a body having a top foldable portion connected to a lower portion along a living hinge;
    the top foldable portion having a top foldable inner face and a top foldable outer face;
    the lower portion having a lower portion inner face and a lower portion outer face;
    a quiver assembly attached to the lower portion outer face of the body and forming a quiver bore wherein the quiver bore tapers in diameter;
    the quiver bore configured such that a portion of the element may be inserted into and removed from the quiver bore; and
    adhesive configured to attach the top foldable inner face to a horizontal surface of an object and to attach the lower portion inner face to a vertical surface of the object.

2. The apparatus of claim 1 wherein the object is an electronic device.

3. The apparatus of claim 1 wherein the element is an earbud having an earbud extension and wherein the quiver bore is configured to have the earbud extension inserted into and removed from the quiver bore.

4. The apparatus of claim 1 wherein the living hinge is a score formed between the top foldable portion and the lower portion.

5. The apparatus of claim 1 wherein the living hinge is a score formed between the top foldable outer face and the lower portion outer face.

6. The apparatus of claim 1 wherein a bottom surface of the quiver assembly is slanted upward and away from the body.

7. The apparatus of claim 1 wherein the body, the living hinge, and the quiver assembly are all integrally formed.

8. The apparatus of claim 1 wherein the body has rounded corners.

9. The apparatus of claim 1 wherein the quiver bore is open at both ends.

10. The apparatus of claim 1 wherein the quiver assembly also forms a second bore which tapers in diameter.

11. The apparatus of claim 1 wherein the adhesive is a single piece sized to cover the top foldable inner face and the lower portion inner face.

12. Apparatus for holding earbuds, the earbuds having earbud extensions, the apparatus comprising:
    a case configured to encase a portion of an electronic device; and
    a quiver assembly integrated with the case and forming two quiver bores wherein the quiver bores taper in diameter;
    the two quiver bores configured to hold the earbud extensions;
    wherein the quiver assembly is oriented at an edge of the case, such that when the earbud extensions are inserted into the quiver bores, tops of the earbuds extend over the edge of the case.

13. The apparatus of claim 12 wherein the case encases the entire electronic device.

14. The apparatus of claim 12 wherein a bottom surface of the quiver assembly is slanted upward and away from the case.

15. The apparatus of claim 12 wherein the quiver bores are open at both ends.

16. The apparatus of claim 6 wherein the slant formed upward and away from the body forms an angle of about 120°.

17. The apparatus of claim 10 wherein the quiver assembly further comprises a central area between the bores and which forms a front wall in front of the bores, wherein the central area that is solidly filled in between the two bores and between the bores and the front wall.

18. The apparatus of claim 10 wherein the quiver assembly is configured to form an unbroken cylinder around each bore and wherein the cylinders have openings only at each end.

19. The apparatus of claim 4 wherein the top foldable portion is flat and perpendicular to the lower portion when the top foldable inner face is attached to the horizontal surface of the object and the lower portion inner face is attached to the vertical surface of the object, such that the top foldable portion and the lower portion form a right angle.

* * * * *